US010667172B2

(12) United States Patent
Ingerman

(10) Patent No.: US 10,667,172 B2
(45) Date of Patent: May 26, 2020

(54) DOWNLOAD MANAGEMENT WITH CONGESTION MITIGATION FOR OVER THE AIR CONTENT DELIVERY TO VEHICLES

(71) Applicant: Akamai Technologies, Inc., Cambridge, MA (US)

(72) Inventor: Mark M. Ingerman, Newton, MA (US)

(73) Assignee: Akamai Technologies, Inc., Cambridge, MA (US)

(*) Notice: Subject to any disclaimer, the term of this patent is extended or adjusted under 35 U.S.C. 154(b) by 0 days.

(21) Appl. No.: 16/010,602

(22) Filed: Jun. 18, 2018

(65) Prior Publication Data
US 2019/0387430 A1    Dec. 19, 2019

(51) Int. Cl.
| H04W 28/02 | (2009.01) |
| H04W 4/40 | (2018.01) |
| H04L 29/08 | (2006.01) |
| H04W 84/04 | (2009.01) |

(52) U.S. Cl.
CPC ......... *H04W 28/0289* (2013.01); *H04L 67/34* (2013.01); *H04W 4/40* (2018.02); *H04W 28/0247* (2013.01); *H04W 84/042* (2013.01)

(58) Field of Classification Search
CPC ......... H04W 28/0247; H04W 28/0289; H04W 4/40; H04W 84/042; H04L 67/02; H04L 67/0247; H04L 67/2842; H04L 41/08; H04L 41/0803; H04L 41/0813; H04L 41/082; H04L 41/50; H04L 41/5003; H04L 43/08; H04L 43/0876; H04L 63/00; G06F 8/21; G06F 8/65
See application file for complete search history.

(56) References Cited

U.S. PATENT DOCUMENTS

| 6,820,133 | B1 | 11/2004 | Grove et al. |
| 7,111,057 | B1 | 9/2006 | Wein et al. |
| 7,240,100 | B1 | 7/2007 | Wein et al. |
| 7,274,658 | B2 | 9/2007 | Bornstein et al. |

(Continued)

OTHER PUBLICATIONS

Meneguette et al., "A novel self-adaptive content delivery protocol for vehicular networks", Feb. 14, 2018, Elsevier, Ad Hoc Networks 73 (2018), https://doi.org/10.1016/j.adhoc.2018.02.005, pp. 1-13, (Year: 2018).*

(Continued)

*Primary Examiner* — Paul H Masur

(57) ABSTRACT

Among other things, this document describes systems, devices, and methods for wireless content delivery to vehicles and in particular to vehicles in cellular radio environments. The teachings hereof can be used to deliver a vehicle manufacturer's head unit updates, firmware, configurations, and other data to a vehicle. In embodiments, downloads are managed at the control plane and/or data plane. Download management can include mitigating either current or anticipated wireless congestion at cell towers, enforcing campaign priority for firmware updates, accommodating occupant-originated data flows to and from the vehicle, and/or accounting for contractual data arrangements between vehicles makers and cellular providers, among other things.

22 Claims, 9 Drawing Sheets

(56) References Cited

U.S. PATENT DOCUMENTS

| | | |
|---|---|---|
| 7,296,082 B2 | 11/2007 | Leighton et al. |
| 7,373,416 B2 | 5/2008 | Kagan et al. |
| 7,376,716 B2 | 5/2008 | Dilley et al. |
| 7,472,178 B2 | 12/2008 | Lisiecki et al. |
| 7,500,010 B2 | 3/2009 | Harrang et al. |
| 7,660,296 B2 | 2/2010 | Fletcher et al. |
| 7,778,595 B2 | 8/2010 | White et al. |
| 7,921,196 B2 | 4/2011 | Harrang et al. |
| 7,953,390 B2 | 5/2011 | White et al. |
| 7,978,711 B2 | 7/2011 | Harrang et al. |
| 8,019,886 B2 | 9/2011 | Harrang et al. |
| 8,359,007 B2 | 1/2013 | White et al. |
| 8,463,933 B2 | 6/2013 | Harrang et al. |
| 8,495,196 B2 | 7/2013 | Harrang et al. |
| 8,583,820 B2 | 11/2013 | Harrang et al. |
| 8,589,508 B2 | 11/2013 | Harrang et al. |
| 8,589,585 B2 | 11/2013 | Harrang et al. |
| 8,671,203 B2 | 3/2014 | Harrang et al. |
| 8,719,399 B2 | 5/2014 | Harrang et al. |
| 8,745,260 B2 | 6/2014 | Harrang et al. |
| 8,812,722 B2 | 8/2014 | Harrang et al. |
| 8,824,289 B2 | 9/2014 | Gormley et al. |
| 8,832,305 B2 | 9/2014 | Moinzadeh et al. |
| 8,886,790 B2 | 11/2014 | Harrang et al. |
| 8,909,807 B2 | 12/2014 | Harrang et al. |
| 8,949,452 B2 | 2/2015 | Harrang et al. |
| 9,065,595 B2 | 6/2015 | Harrang et al. |
| 9,143,341 B2 | 9/2015 | Harrang et al. |
| 9,172,643 B2 | 10/2015 | Harrang et al. |
| 9,363,185 B2 | 6/2016 | Harrang et al. |
| 9,378,508 B2 | 6/2016 | Burnette et al. |
| 9,654,579 B2 | 5/2017 | Stevens et al. |
| 9,667,747 B2 | 5/2017 | Shotton et al. |
| 9,721,616 B2 | 8/2017 | Hadorn et al. |
| 9,742,861 B2 | 8/2017 | Harrang et al. |
| 9,769,279 B2 | 9/2017 | Burnette et al. |
| 9,807,010 B2 | 10/2017 | Luciani et al. |
| 9,888,003 B2 | 2/2018 | Harrang et al. |
| 9,888,053 B2 | 2/2018 | Burnette et al. |
| 9,906,595 B2 | 2/2018 | Nordness et al. |
| 2010/0070628 A1 | 3/2010 | Harrang et al. |
| 2010/0121941 A1 | 5/2010 | Harrang et al. |
| 2010/0198943 A1 | 8/2010 | Harrang et al. |
| 2010/0274871 A1 | 10/2010 | Harrang et al. |
| 2010/0274872 A1 | 10/2010 | Harrang et al. |
| 2011/0029664 A1 | 2/2011 | Harrang et al. |
| 2011/0044227 A1 | 2/2011 | Harrang et al. |
| 2011/0047286 A1 | 2/2011 | Harrang et al. |
| 2011/0047287 A1 | 2/2011 | Harrang et al. |
| 2011/0133319 A1 | 6/2011 | Harrang et al. |
| 2011/0173108 A1 | 7/2011 | Rajasekar et al. |
| 2011/0173345 A1 | 7/2011 | Knox et al. |
| 2011/0320607 A1 | 12/2011 | Harrang et al. |
| 2012/0244863 A1 | 9/2012 | Burnette et al. |
| 2013/0117349 A1 | 5/2013 | Burnette et al. |
| 2013/0124679 A1 | 5/2013 | Harrang et al. |
| 2013/0124747 A1 | 5/2013 | Harrang et al. |
| 2014/0105019 A1 | 4/2014 | Harrang et al. |
| 2014/0119184 A1 | 5/2014 | Harrang et al. |
| 2014/0222967 A1 | 8/2014 | Harrang et al. |
| 2014/0280996 A1 | 9/2014 | Harrang et al. |
| 2014/0315536 A1 | 10/2014 | Chow et al. |
| 2015/0019746 A1 | 1/2015 | Shatzkamer et al. |
| 2016/0117162 A1 | 4/2016 | Searle et al. |
| 2016/0191651 A1 | 6/2016 | Balakrishnan |
| 2016/0191664 A1 | 6/2016 | Balakrishnan et al. |
| 2017/0024201 A1 | 1/2017 | Diedrich et al. |
| 2017/0272485 A1 | 9/2017 | Gordon et al. |
| 2017/0344355 A1* | 11/2017 | Sarkar ..................... G06F 8/65 |
| 2018/0018159 A1* | 1/2018 | Eller ..................... H04W 4/44 |
| 2018/0146058 A1* | 5/2018 | Somayazulu ........... H04L 43/16 |
| 2018/0278507 A1* | 9/2018 | Sintorn ................... H04L 43/16 |
| 2019/0037349 A1* | 1/2019 | Frusina ............... H04N 21/238 |
| 2019/0037418 A1 | 1/2019 | Gunasekara et al. |
| 2019/0098118 A1 | 3/2019 | Utama |
| 2019/0182114 A1* | 6/2019 | Tavridis ................. G06N 20/00 |
| 2019/0187971 A1* | 6/2019 | Wang ........................ G06F 8/65 |
| 2019/0265965 A1* | 8/2019 | Acharya ................. H04L 12/40 |
| 2019/0386923 A1 | 12/2019 | Ingerman |

OTHER PUBLICATIONS

U.S. Appl. No. 15/682,018, filed Aug. 21, 2017.
U.S. Appl. No. 16/010,604, filed Jun. 18, 2018.
Google Groups, Evaluating MQTT Clients, downloaded on Mar. 19, 2018, 2 pages. Available at https://groups.google.com/forum/#!topic/mqtt/17rsdjj3-xc.
Gupta, 5 Things to Know About MQTT—The Protocol for Internet of Things, Sep. 23, 2014,, 5 pages. Downloaded on Mar. 19, 2018. Available at https://www.ibm.com/developerworks/community/blogs/5things/entry/5_things_to_know_about_mqtt_the_protocol_for_internet_of_things?lang=en.
Jain, et al., IETF, Moblie Throughput Guidance Inband Signaling Protocol, Mar. 13, 2017, 16 pages.
Oasis Standard, MQTT Version 3.1.1, Oct. 29, 2014, 81 pages.
Obermaier, Re: [paho-dev] MQTT client throttling, Sep. 18, 2015, 4 pages. Downloaded on Mar. 19, 2018. Available at http://dev.eclipse.org/mhonarc/lists/paho-dev/msg02920.html.
Counterpart PCT/US2019/036772 International Search Report dated Sep. 26, 2019, 3 pages.
Counterpart PCT/US2019/036772 Search Strategy dated Sep. 26, 2019, 1 page.
Counterpart PCT/US2019/036772 Written Opinion dated Sep. 26, 2019, 5 pages.
Office Action for related U.S. Appl. No. 16/010,604, dated Aug. 16, 2019 42 pages.
Applicant response to Office Action for related U.S. Appl. No. 16/010,604, dated Aug. 16, 2019; response dated Jan. 15, 2020, 13 pages.
Related U.S. Appl. No. 16/010,604.
Final Office Action, for U.S. Appl. No. 16/010,604, dated Mar. 26 2020, 37 pages.

* cited by examiner

DOWNLOAD MANAGEMENT WITH CONGESTION MITIGATION FOR OVER THE AIR CONTENT DELIVERY TO VEHICLES

BACKGROUND

Technical Field

This application relates generally to systems, devices, and methods for wireless content delivery to vehicles and more particularly to systems, devices and methods for content delivery to running vehicles over cellular radio networks.

Brief Description of the Related Art

The so-called "Internet of Things" creates an opportunity to provide content delivery services to millions of connected items, not least of which is a connected vehicle. More and more, vehicle manufacturers are incorporating computer technology into their vehicles. Many manufacturers desire to receive diagnostic data from vehicles and to deliver data files to the vehicles, such as head unit updates (e.g., patches to correct safety issues, fix bugs, add features), navigation/map data, music libraries, messages for vehicle owners, or the like. Today, this data is typically delivered to vehicles over wide area cellular networks, and it is transmitted while the vehicle is running, so that adequate electrical power is available.

The amount of data flowing to vehicles over the cellular network will continue to increase dramatically, placing a strain on wireless networks. Even today a single firmware update for a head unit can be one hundred megabytes or more. Like any user of mobile networks, vehicle manufacturers pay for bandwidth. They need to manage their data delivery to optimize cost, minimize the effects of cellular congestion, and respect the data demands of vehicle occupants (e.g., personal mobile device use). In addition, all firmware or other updates are not equal in priority: a safety-related patch is clearly more time-sensitive than adding a new feature to an in-car entertainment system. Vehicle manufactures refer to the deployment of updates as "campaigns". Each campaign typically is associated with metadata such as a campaign priority, vehicle make and model to which the campaign applies (although some campaigns to only some vehicles of a particular make and model), byte size, and the like. The campaign also may be associated with a delivery deadline.

It is known in the art to use commercial content delivery network (CDN) infrastructure to deliver data to vehicles over cellular networks. CDNs typically comprise a distributed set of servers that deliver content on behalf of a cooperating content provider (in this case, the vehicle manufacturers). Using a CDN or similar infrastructure, files from a vehicle manufacturer's origin server can be distributed to vehicles on the road. However, the management of those downloads, including the mitigation of congestion on cellular networks, has not been addressed. The teachings hereof address this technical need, providing improved computer methods, systems, and apparatus for delivering data more quickly and efficiently in face of potential last-mile network congestion. Those skilled in the art will understand these and other improvements from the teachings hereof.

BRIEF SUMMARY

Among other things, this document describes systems, devices, and methods for wireless content delivery to vehicles and in particular to vehicles in cellular radio environments. The teachings hereof can be used to deliver a vehicle manufacturer's head unit updates, firmware, configurations, and other data to a vehicle. In embodiments, downloads are managed at the control plane and/or data plane. Download management can include mitigating either current or anticipated wireless congestion at cell towers, enforcing campaign priority for firmware updates, accommodating occupant-originated data flows to and from the vehicle, and/or accounting for contractual data arrangements between vehicles makers and cellular providers, among other things.

The foregoing is a description of certain aspects of the teachings hereof for purposes of illustration only; it is not a definition of the invention. The claims define the scope of protection that is sought, and are incorporated by reference into this brief summary.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

The term web page or "page" is meant to refer to a browser or other user-agent presentation defined by an HTML or other markup language document.

The terms automaker and vehicle manufacturer are used interchangeably in this patent document. The terms 'object' and 'resource' are used interchangeably in this patent document. The terms 'domain name' and 'hostname' are used interchangeably in this patent document.

Introduction

Figure 1:
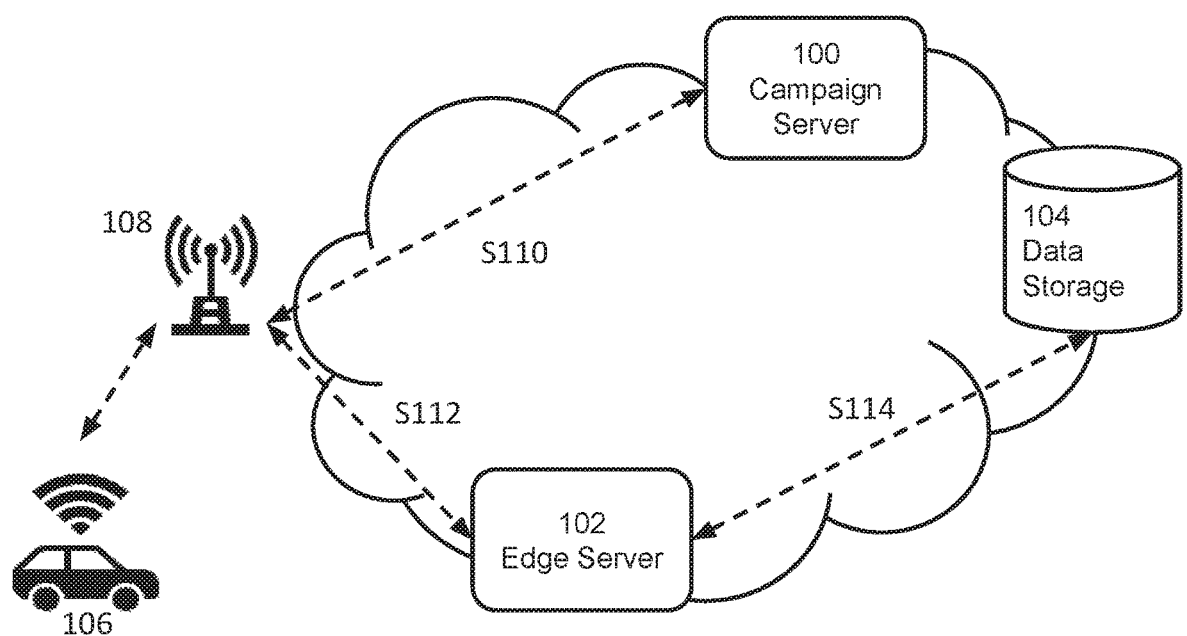
FIG. 1 is a diagram illustrating a system for the delivery of content to vehicles using a conventional approach (labeled as 'Prior Art')

Conventionally, when a vehicle is started (engine ignition), a vehicle's head unit can make a request to determine if there are any firmware patches, or other patches, that are due. The update process can then proceed, in general, as shown in FIG. 1 (Prior Art), which is described below:

On engine ignition, the head unit of the vehicle 106 will contact a campaign server 100, which is typically operated and/or controlled by an automaker. This occurs at step S110, the dashed line should be interpreted to represent the flow of one or more messages (e.g., a message exchange) over a communication channel, such as an HTTP session over a TLS-secured TCP/IP connection, or any other suitable networking stack. Those skilled in the art will understand that the individual arrows are a logical representation; the TCP/IP connection may be split into multiple segments, while the TLS-secured HTTP session extends from vehicle 106 to campaign server 100. Regardless, the head unit of the vehicle 106 sends a message up to the campaign server 100 (via cell tower 108) to determine if a download is warranted. Typically, the upstream message includes information about the vehicle, make and model, currently installed firmware, and the like. The campaign server determines whether the particular vehicle requires an update, that determination can be based for example on the make/model and other vehicle information.

The head unit in the vehicle 106 receives a response message from the campaign server 100 indicating what particular action should take place, such as:

a. Nothing—everything is up to date
b. Download the update (or updates) immediately and apply them when ready.
c. Retry—check back or download patches at some future time At the appropriate time, the head unit will download the patch and apply it. In theory, the campaign server 100 could serve the actual content of the update to the vehicle 106. However, in modern systems, the vehicle manufacturer can use a CDN to deliver the data. This means that head unit contacts an edge server 102 of the CDN at step S112; the edge server is preferably selected from the CDN's pool of servers because it is located such that it has low latency to the current location of the vehicle. At SI 14, the edge server 102 fetches the requested data from the data storage 104, if not in local cache already. The data storage can be operated by the vehicle manufacturer or by the CDN provider for the vehicle manufacturer's use. The edge server 102 then delivers the data to the vehicle 106 (back at S112). In sum, the head unit of the vehicle 106 requests a patch from the edge server 102 via cell tower 108 and the edge server 102 either delivers the requested data from local cache or pulls the data the vehicle manufacturer.

It was stated above that either or both of the edge server 102 and data storage 104 may be provided by a content delivery network (CDN) service provider as a service to the vehicle manufacturer. More detail about CDN infrastructure will be provided later in this document.

Over the Air Downloads with Enhanced Management

The system shown and described with respect to FIG. 1 provides scalability and offload for the vehicle manufacturer during the download of the actual update data due to the use of the CDN. This is purely a data plane improvement that accelerates the delivery of the update file itself. But, it does not take into account potential cellular congestion or other cellular traffic management considerations. As noted above, bandwidth requirements for delivering updates are growing dramatically and automakers increasingly need to push patches out in short time windows and in complex, noisy cellular environments.

Of particular concern is the last-mile transfer between the cell tower 108 and the vehicle 106 in FIG. 1. Consider the impact to cellular towers and networks if every one of a particular vehicle make in a metropolitan area all tried to download the same 100 MByte patch at roughly the same time. Congestion would be likely—or the cellular providers would need to shape the traffic in some way (e.g., limit bandwidth) to protect their networks. This means extending the amount of time it will take to complete a campaign and/or incurring charges for the level of use.

According to the teachings hereof, the system shown in FIG. 1 can be modified and augmented to provide a mechanism to monitor congestion and mitigate it, and otherwise to control and optimize a range of download management factors. Adding such control can relax or even remove the need for the cellular providers to set limits for cellular downloads. Also it can enable automakers to utilize available bandwidth efficiently and in cooperation with their cellular providers. Such a cellular congestion monitoring and mitigation subsystem can be provided by the CDN, although this is not necessary. But assuming the CDN (or other multi-tenant service provider entity) provides services to multiple vehicle manufacturers, it can collect cellular data from across vehicle manufacturers, presenting a more accurate and comprehensive picture of congestion, which is envisioned by the teachings hereof.

Figure 2A:
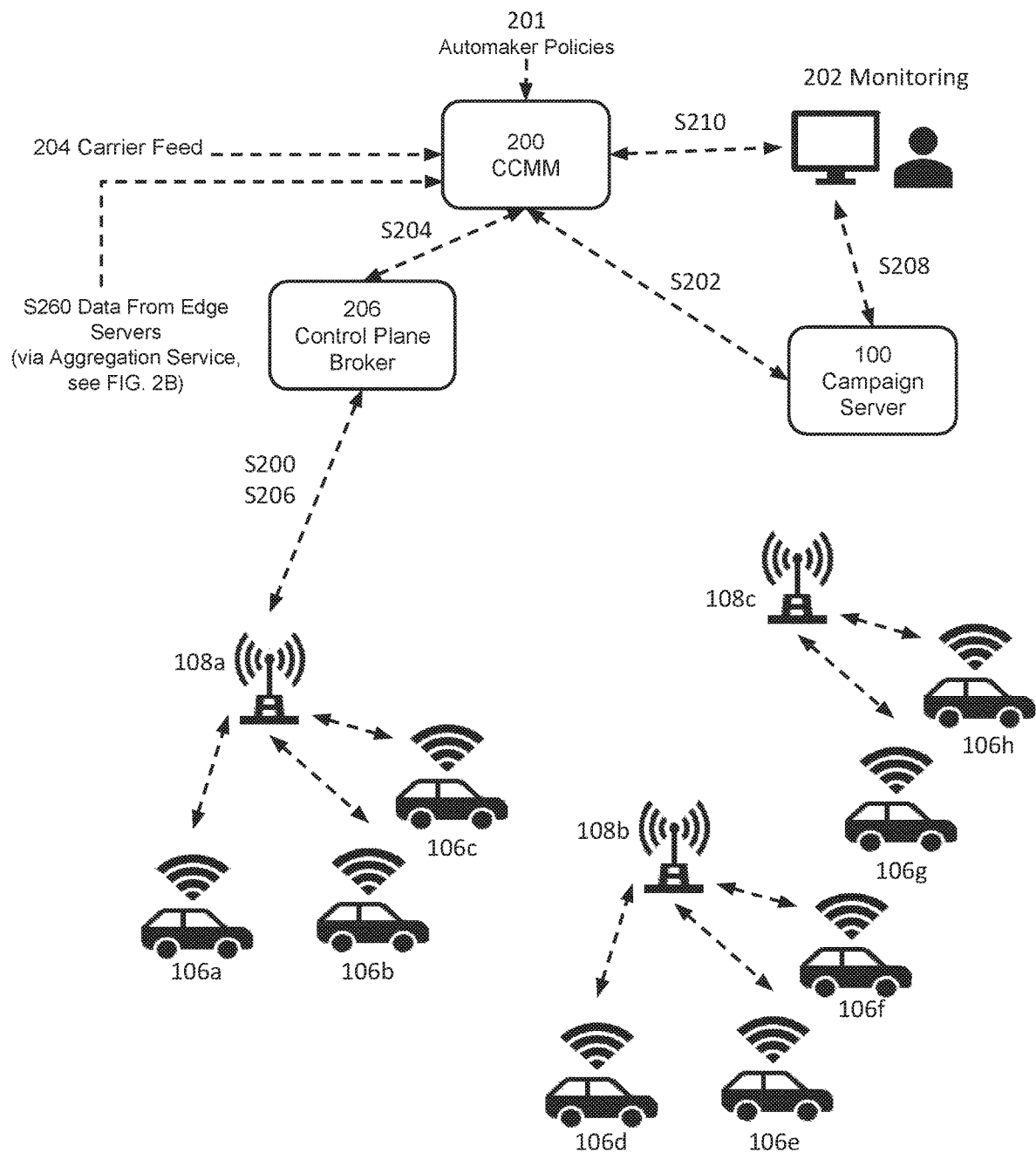
FIG. 2A is a diagram illustrating a system for accelerating and managing delivery of content to vehicles, in one embodiment.

FIG. 2A/2B Embodiment—Control Plane Manages Download Traffic

In a first embodiment, a service is implemented in a control plane to manage the download process, including in particular the timing and data rate at which downloads occur. The cellular congestion and download management entity (CCMM 200) collects information about congestion in the mobile network. Congestion information could be collected directly from cellular operators, or via other congestion monitoring mechanisms, which will be described in detail below. In addition, congestion information gathered from vehicle head units can be collected and aggregated into a data feed to the CCMM service 200, as will also be described in further detail below. The CCMM 200 service can determine areas of congestion (e.g., on a cell tower by tower basis) and consult policies that determine how to handle a particular slice of traffic. The policies typically provide conditions and more generally the logic and settings to determine whether to invoke congestion mitigation, and if so, what actions to take. Preferably, the policies will be configured by a vehicle manufacturer to reflect their own traffic management rules and preferences as well as their traffic constraints, which can be based on their contractual arrangement with their cellular carrier (e.g., usage caps, time of day restrictions). However, it should be understood that in some embodiments, the CCMM 200 can be configured to accept a policy directly from a cellular network carrier—and/or even to accept from that carrier real-time traffic control directives, e.g., to stop or limit traffic—in addition to a vehicle manufacturer's policy.

In one embodiment, the CCMM 200 can interact with the campaign server 100 and/or a vehicle 106 to suspend/prioritize lower priority campaigns. A system administrator (e.g., a user working for the CDN or vehicle manufacturer) who is monitoring the congestion can do the same thing on a user interface provided by the CCMM 100, referred to as the CCMM dashboard (202).

Mitigation directives can be transmitted from the CCMM 200 down to the head unit of the vehicle, within responses to vehicle queries, or when connecting to the network to download a patch. This causes the head unit to temporarily delay or suspend the download, or to throttle it.

Figure 2B:
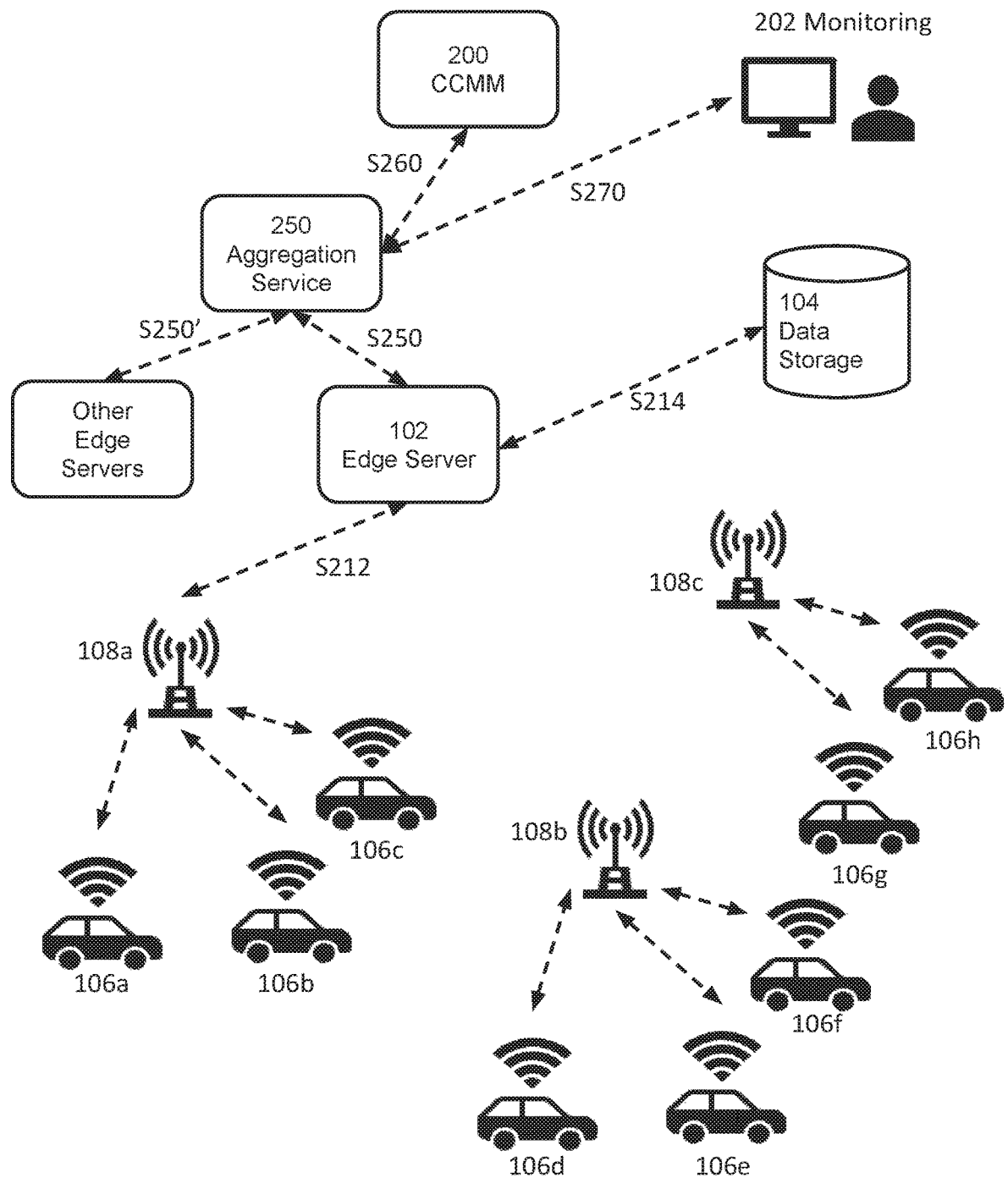
FIG. 2B is a diagram illustrating a data plane for the system shown in FIG. 2A, in an embodiment.

FIG. 2A provides an illustration of a system in accord with this first embodiment. FIG. 2A focuses on the control plane elements; FIG. 2B adds the data plane elements.

Referring to FIG. 2A, vehicles 106a-h represent vehicles that may need an update and that connect to campaign server 100 and to the control plane broker 206, both connections being via cell towers 108a-c. At the outset, it should be understood that FIG. 2A does not depict all messaging flows in the system, in order to avoid cluttering the diagram. Rather, an exemplary set of messaging with respect to cell tower 108a and vehicle 106a is shown and described, but the reader should assume that other cell towers and vehicles are operating similarly and contemporaneously.

The control plane broker 206 is managed by the CCMM 200 to control the download activity of the vehicles 106a-h. Preferably, the control plane broker 206 is implemented as an MQTT server (MQ Telemetry Transport server) that publishes messages on a range of topics to which the vehicles 106a-h can subscribe. For example, the control plane broker 206 may publish messages on topics corresponding to a particular campaign, a particular cell tower, to a particular vehicle make and/or model, and even to a particular vehicle itself (e.g., a particular vehicle identification number or VIN). Any topic is possible.

As shown in FIG. 2A, on the back end, the CCMM 200 takes in congestion data from the carrier feed 204, from a data feed 260 created by aggregating data collected from vehicles 106a-h (shown in FIG. 2B) and/or any other source. The CCMM 200 can provide this information to a monitoring center 202 for visualization.

When the CCMM 200 detects or predicts congestion, it applies one or more policies of the corresponding vehicle manufacturer and determines an appropriate action, e.g., by sending congestion mitigation or other directives to the vehicles 106a-h via the broker 206.

The CCMM 200 also manages the downloads in other ways. For example, the CCMM 200 can enforce cellular usage limits for the vehicle manufacturer, such as on a per-tower or per-network (aggregated) basis. The CCMM 200, receiving progress updates from the vehicles 106a-h, can monitor the status of campaigns for a given vehicle or in the aggregate across all vehicles subject to the campaign. If a particular vehicle and/or campaign were falling behind schedule (assume for example deadline for a particularly important safety update), the CCMM 200 can address this situation by de-prioritizing other in-progress campaigns of lower priority. Generalizing, the CCMM 200 can monitor and manage virtually any aspect of a download to a vehicle.

The operation of the system shown in FIG. 2A is now described.

At S200, upon engine startup, the head unit of a given vehicle (e.g., vehicle 106a) is configured to contact the broker 206 and subscribe to topics corresponding to its head unit version and to its make and model. The head unit will thereafter receive messages on those topics in accord with, preferably, the MQTT protocol, at S206.

Meanwhile, at S202, the campaign server 100 contacts the CCMM 200 and requests that the initiation of a new campaign. The campaign server 100 can provide metadata about the campaign, such as a campaign identifier, URL for the update file, the make/model and/or head unit versions of vehicles to which the campaign applies, a priority level. A safety patch, for example, typically would have a higher priority than an update to an entertainment interface. The metadata can also include a manifest file with multiple URLs, each pointing for example to a segment of the overall update.

The CCMM 200 ingests this information and begins the campaign by publishing (via broker 206) a 'campaign start' message and the URL for the update file on the topic or topics for the relevant make/model and/or head unit versions. The message would typically include a campaign identifier, too.

All subscribed vehicles then begin the download by contacting the data plane of the system with the provided URL, and that process will be described below in connection with FIG. 2B. To accommodate vehicles that need to be updated but are not subscribed at the time the campaign start message is published, preferably the broker 206 flags the directive to 'start download' as an MQTT retained message. This means that when newly subscribing vehicles join the topic after the campaign start, the broker will send them the 'campaign start' message so they can begin the download. Thereafter, they are following the topic and will receive later directives applicable to the campaign.

Note that in some cases, particularly for more complex campaigns, the CCMM 200 may publish a 'contact campaign server 100' directive to certain makes/models of vehicles or head unit versions. This means that the receiving vehicles should contact the campaign server 100 to find out if they truly need an update. The campaign server 100 can then respond to those vehicles with a message indicating that (i) they do not need an update or that (ii) they do need an update providing the URL for the update file. This approach is particularly suited to more complex campaigns, for example a braking system or other component update that applies to some vehicles of a particular make and model, but not all vehicles of that make and model have that component or component version installed.

Regardless of how the campaign starts, the CCCM 200 can send directives after the campaign has begun. Assume that vehicles 106a to 106e have begun downloading an update. The CCMM 200 can send a directive to throttle (data rate control), pause, cancel/retry a download for a particular campaign identifier. Typically, the CCMM would publish the directive on a topic for a particular campaign, i.e., by campaign identifier. However, if a particular cell tower were overloaded, then the throttling directive could be sent on a topic for specific cell tower, in effect informing all vehicles currently attached to that cell tower to change their download behavior. Finally, directives could be published to specific topics specific to particular make/model and/or head unit version; however, such specific messages are not preferably used for congestion mitigation or traffic management, but rather to inform vehicles of a particular make/model to contact the campaign manager to see if they need an update, or for other "housekeeping" functions. In this way, all vehicles that are part of a given campaign generally start, stop, and pause, etc., together, in an orchestrated manner. Of course, this is not limiting and only one example. As another example, the broker 206 the CCMM 200 via the broker 206 could send a directive regarding a particular cell tower, i.e., to the topic for cell tower 108a. Since all vehicles connected to that cell tower would be listening to that topic, this directive would instruct all vehicles connected to that cell tower to throttle, pause, or cancel/retry, thereby addressing localized cellular congestion or other issues. When a vehicle moves to a new tower, it would listen to a new topic for that cell tower, and follow the throttling (or absence of throttling) associated with the new tower automatically.

The CCMM 200 could even instruct a single vehicle, via its individual topic, to change its download behavior.

In addition, the CCMM 200 can manage downloads on the basis of the priority of campaigns. For example, assume the campaign server 100 communicates to the CCMM 200 a request to initiate a high-priority campaign. The CCMM 200 could react by throttling or pausing lower priority campaigns to allow the higher-priority campaign to proceed expeditiously.

In sum, the CCMM 200 can manage the downloads in a fine-grained manner by campaign, cell tower, individual vehicle, makes/models of vehicles, or on the basis of any other attribute that can correspond to a pub/sub topic. Note that the use of MQTT is merely exemplary, any publish/subscribe protocol providing the functionality described herein can be used.

Cell tower congestion, active campaigns and other conditions will change over time. The CCMM 200 is continually receiving cellular congestion information from carriers 204 as well as cellular data rate/congestion measurements from in-progress downloads. It also receives policy information from a vehicle manufacturer. The CCMM 200 uses this information determine how to manage the downloads to the vehicles 106.

FIG. 2B illustrates the data plane for the system shown in FIG. 2A.

To download the actual file or portion thereof representing an update, a vehicle (e.g., vehicle 106a) will make a request to the campaign URL it received from the campaign server 100 (or, in some embodiments, from the broker 206). As a predicate, the hostname of the campaign URL is resolved (e.g., via DNS) to an edge server 102 in a CDN, typically a CDN request routing system would be applied to select the closest edge server (in network distance terms) that can server the request.

After the DNS resolution process, the vehicle 106a makes a content request, such as a HTTP 'GET' or 'POST' request, to the edge server 102 for the content under the URL (S212). In accord with conventional CDN operation, the edge server 102 may apply configuration metadata for the URL to understand how to handle the request. (See e.g., U.S. Pat. Nos. 7,240,100 and 9,667,747 and 9,654,579, the contents of which are incorporated herein by reference. The edge server 102 checks its local cache to see if it has the requested content.) If it does, the update can be served to the vehicle 106a. If not, the edge server 102 can fetch the content from the data storage 104 (S214).

Typically, the system will be set up so that an update is segmented into a number of individually requestable chunks (either with individual URLs or via HTTP range requests). If so, the request and response operation is repeated for each segment.

In response to CCMM 200 directives delivered via the control plane in FIG. 2A, the vehicle 106 may throttle the download, pause, or take other action. The edge server 102 simply responds appropriately to the vehicle 106 in a normal way. The edge server 102 may be adapted, though, to monitor the throughput or other metric indicative of network congestion to a vehicle during downloads. The edge server 102 can also monitor the status of a given download to a vehicle (e.g., via the client acknowledgements it receives). At S250, the edge server 102 can then publishes such statistics (e.g., via MQTT or otherwise), including therein such information as the vehicle, campaign, carrier, cell tower, and the like, for which they were observed. This data can be sent to an aggregation service 250. The aggregation service 250 receives and aggregates this kind of data from other edge servers across the platform, as shown in FIG. 2B at S250'. The aggregated information can be delivered at S270 to Monitoring 202 and at S260 to the CCMM 200 to inform decision-making in supplement to, or in place of carrier feeds 204 in FIG. 2A. It should be understood that the data published upstream at S260 differs from log data in that it is real-time. The edge servers 102 can generate log data and download receipts also (e.g., for billing purposes or later offline analysis).

Additional Detail on CCMM 200 and Congestion Calculation

The CCMM 200 relies on an ability to determine the current congestion state and/or levels. If the CCMM 200 can detect a high level of congestion at a tower or in an area or in a network, it can try to mitigate it. There are variety of techniques that the CCMM can leverage to calculate congestion; below are a few examples.

As shown in FIG. 2A, at 204, the CCMM 200 can receive information directly from the systems of cellular providers. Cellular providers have ways—as known in the art—to determine if their network and more specifically particular cell towers are becoming congested. This information can be accessed via an API call or by receiving push notifications of certain events (e.g., congestion reaching a particular threshold for a given cell tower). See US Patent Publication Nos. 2015/0019746 and 2011/0173108, incorporated by reference for all purposes. Preferably, such congestion information is provided in a standardized format or the CCMM 200 provides a translation layer to translate provider specific information into a generic format/version so that any processing done on this information can be standardized.

In another embodiment, software in a client (the client being head unit for a vehicle) and server (edge server 102) can determine congestion by having one of them periodically send a packet train to the other and measuring the bottleneck bandwidth/congestion on the link by examining the magnitude to which the packets disperse as they travel through the network. If the available bandwidth is below a threshold, the link can be considered congested. Further, the congestion algorithm can be run on a selected samples of clients and the results extrapolated to larger pools of clients to infer congestion at a given cell tower. These and other techniques are discussed in U.S. Pat. No. 9,807,010, the contents of which are hereby incorporated by reference in their entirety.

In another embodiment, congestion can be calculated by monitoring the progress of downloads (of the campaign updates) by the edge server 102 and the reporting described with respect to FIG. 2B, at S250, S250', S260. In other words, the download performance can be tracked by the edge server 102. This can be done, e.g., by tracking received acknowledgments in an MQTT or similar protocol. Such download management and tracking software would track how long it took to download a particular chunk of data, say 1K. Based the network (e.g., 3G or 4G or 5G), signal strength, etc. a calculation can determine how the download processed compared to a non-congested (expected/optimal) download. If the download time changed by more than a threshold amount (e.g., a percentage, excluding discontinuities caused by cell tower handoffs), a congestion flag can be set in the upstream logs. Here the system can use actual download times on a reasonable sized object to not necessarily to determine a specific congestion value, but whether it is getting better or worse.

Congestion Aggregation

Figure 3:
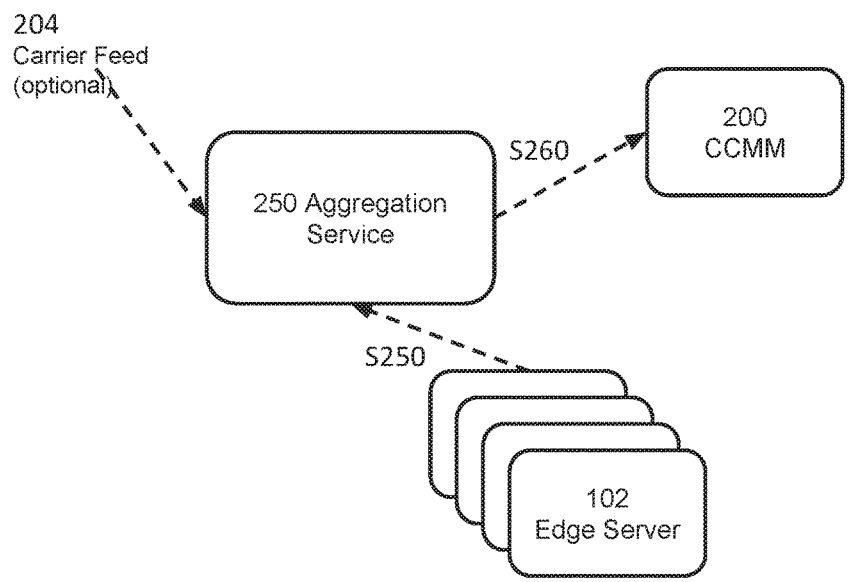
FIG. 3 is diagram illustrating in more detail the aggregation service 250 shown in FIG. 2B.

Congestion information from various sources is aggregated, as mentioned with respect to FIG. 2B, at 250. Data Aggregation Service. The 250. Data Aggregation Service will aggregate the data to average out the congestion for each cell tower for a particular unit of time. Additionally, if desired, alerts can be triggered to show status and trend/changes in congestion either per tower, or per region. FIG. 3 shows this process. The Aggregation Service 250 is receiving multiple congestion updates from edge servers. It is important to note that the congestion information could also be received from carrier feeds 204; in other words, the Aggregation Service could fetch and process carrier feeds 204 from FIG. 2A on behalf of the CCMM 200. Any combination of congestion information from any source can be aggregated and used.

As shown in FIG. 3, the Aggregation Service 250 has aggregated the information down to two rows of averaged information by cell tower id (Cell ID). The data shown in FIG. 3 is merely for illustration; clearly there will be much more data in a running system. Note that one can provide additional layers of aggregation to further aggregate and reduce updates. The Aggregation Service 250 may be implemented in a distributed system using a hierarchical approach (that is, a second level congestion data processor responsible for "several first line" congestion data processors).

Congestion Monitoring User Interface

A congestion monitoring user interface, at monitoring element 202, can be provided so that vehicle manufacturers have a view of the progress of campaigns, of data throughput, and congestion status. Such a system-administrator style interface can be built as a service, with plug-in modules to be loaded in customer's own information technology infrastructure. Also, the CCMM 200 could offer APIs for the vehicle manufacturer to use to fetch congestion data. Hence an manufacturer's campaign manager 100 can be integrated via APIs so that, the monitoring information will include the campaign information such as completion rates or other information specific to the vehicle manufacturer.

In some embodiments, congestion information gathered from across vehicle manufacturers is aggregated in the system. Therefore, in the aggregate the cellular congestion information (e.g., of the type shown in FIG. 3) would include data from all of the automakers participating in the service, providing a more robust data set with higher accuracy and larger coverage.

Congestion Mitigation Examples

There are a wide variety of congestion mitigation scenarios but below are some examples. The system is preferably agnostic as to any particular use case or strategy for determining when to mitigate congestion.

Future congestion: in some cases, congestion may not be present at a given time but the system is able to predict future congestion based on historical network traffic patterns and/or vehicular traffic patterns. For example, during a morning commute in a metropolitan area, as vehicles from suburbs converge to a downtown area, the cell towers serving the downtown area may become congested. Knowing this pattern, the CCMM 200 can invoke mitigation via the broker 206 for some proportion of vehicles attached to suburban cell towers (the originating zone) where such vehicles are likely to end up attached to cell towers in the downtown area (the predicted congestion zone). These patterns can be determined based on historical network traffic patterns and/or based on geography/cell tower placements, and/or based on in-car navigation system routes that a driver has selected.

In some cases, congestion mitigation could be based on the history for a particular vehicle. When a given vehicle is started and attaches to an initial cell tower, the system can anticipate based on historical data for the day/time that the vehicle is likely to soon be traveling to a particular area (e.g., commute to the city) and attach to a particular cell tower along the way or at the destination. It can also be anticipated that the destination cell towers (or "along the path" cell towers) are likely to be congested. Based on that data the CCMM 200 can invoke mitigation. The reverse may also be true—if the vehicle is likely to be traveling to a less congested cell tower, then the system can re-evaluate at that time based on congestion information for the new cell tower.

Usage Monitoring

In addition to being able to monitor cellular congestion, the system can monitor cellular data usage for compliance with service level agreements. For example, a vehicle manufacturer may make a deal with their cellular provider that gives them a certain price for staying under a certain usage limit and/or bandwidth limit. The CCMM 200 can monitor data downloaded via the download manager in the head unit of the vehicle. The vehicle manufacturer can agree with its cellular provider to limit downloads by volume, transfer rate, or transfer rate per cellular tower. In fact, this can even be tiered to say, certain cell towers during these times have one rate, and so on.

As with the congestion monitoring, all of this data can be tracked and sent to the CCMM 200, as well as to a monitoring interface 202. Usage monitoring information can be used as a factor in determining whether to govern or mitigation particular traffic to a particular class of vehicles, campaign, etc., in the same manner as congestion monitoring is used, as described throughout this document.

Vehicle Manufacturer Policies for Congestion Mitigation and Enforcement of Usage Limits There are a variety of techniques that can be used to limit congestion and/or to enforce usage limits, and/or otherwise manage download traffic. Governance of client download time and rates can be controlled by the CCMM 200, under policy set by the vehicle makers. The CCMM 200 can apply policies at various times to determine how and whether to apply mitigation, based on congestion, campaign priorities (as the CCMM 200 can retrieve priority levels for campaigns from the campaign server 100) and usage agreements with the cellular providers, and other information.

A simple pseudocode example of a policy is:

```
Maximum cell usage limit 3G : 25%
Desired cell usage limit 3G: 10%
Desired cell usage off-peak 3G: 15%
Default Campaign Priority: 6
Campaign 2 : 1
Campaign 9 : 7
    THEN mitigate with retry
    ELSE proceed
IF (current congestion of vehicle's cell tower > threshold_1)
IF (download not started) THEN mitigate by sending retry
```

The numerical values provided in the pseudocode above are examples included merely to illustrate how a policy would be written.

In the above policy, the limits on cell usage can be expressed (for example as shown above) as a percentage of cell tower total bandwidth, or alternatively as an amount of data (e.g., in Mbps). A list of cell tower types with varying limits could be included. Default Campaign Priority in the above policy is shown as a ranking. However, campaign priorities could be expressed as percentages, e.g., a campaign defaults to using NN percentage of the available bandwidth at a cell tower, and then the policy lists high priority campaigns that should get a desired minimum percentage, with the assumption that default campaigns can be throttled to accommodate a campaign with a specified priority.

Figure 4A:
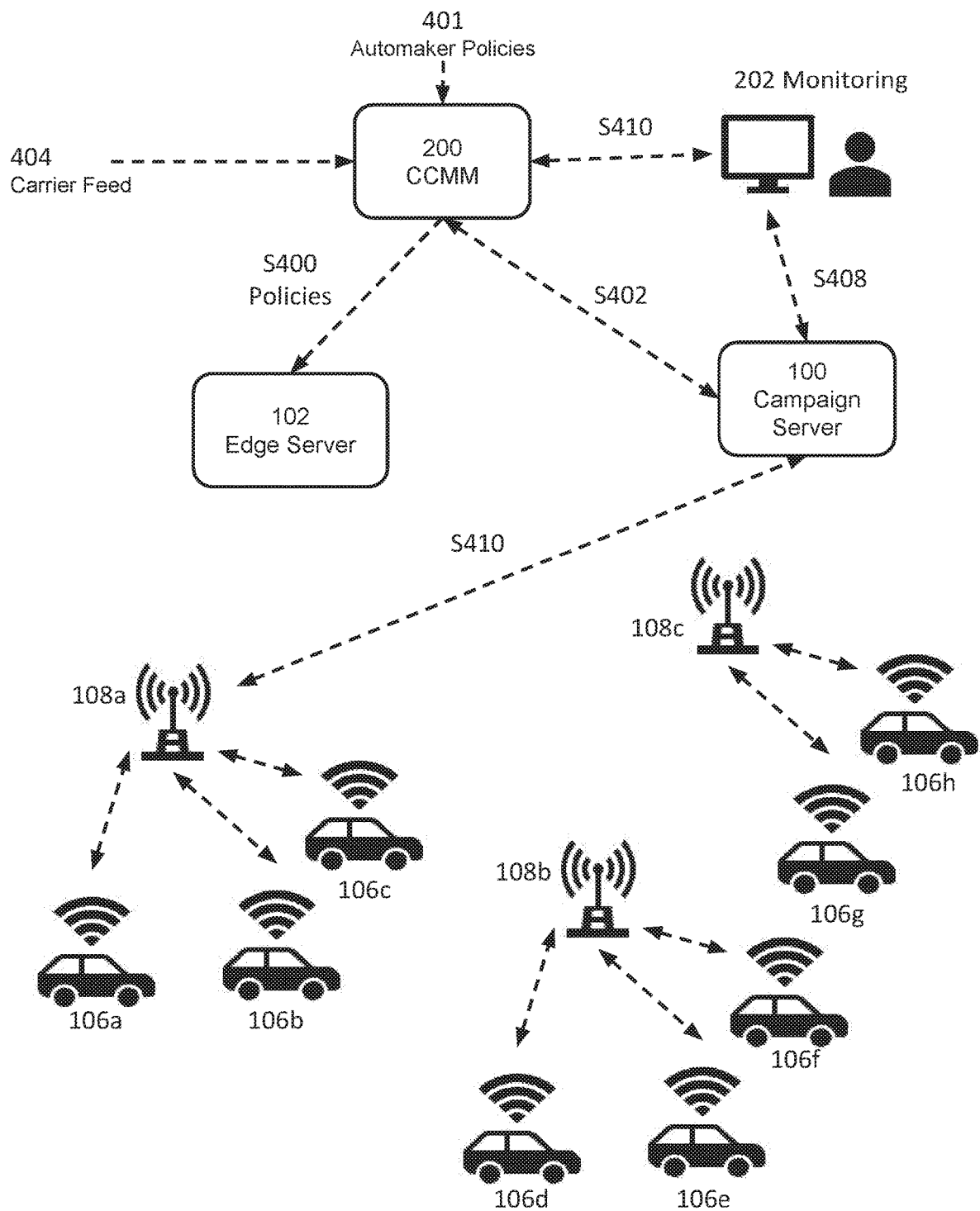
FIG. 4A is a diagram illustrating a system for accelerating and managing delivery of content to vehicles, in another embodiment.

FIG. 4A/4B Embodiment—Data Plane Manages Download Traffic

Figure 4B:
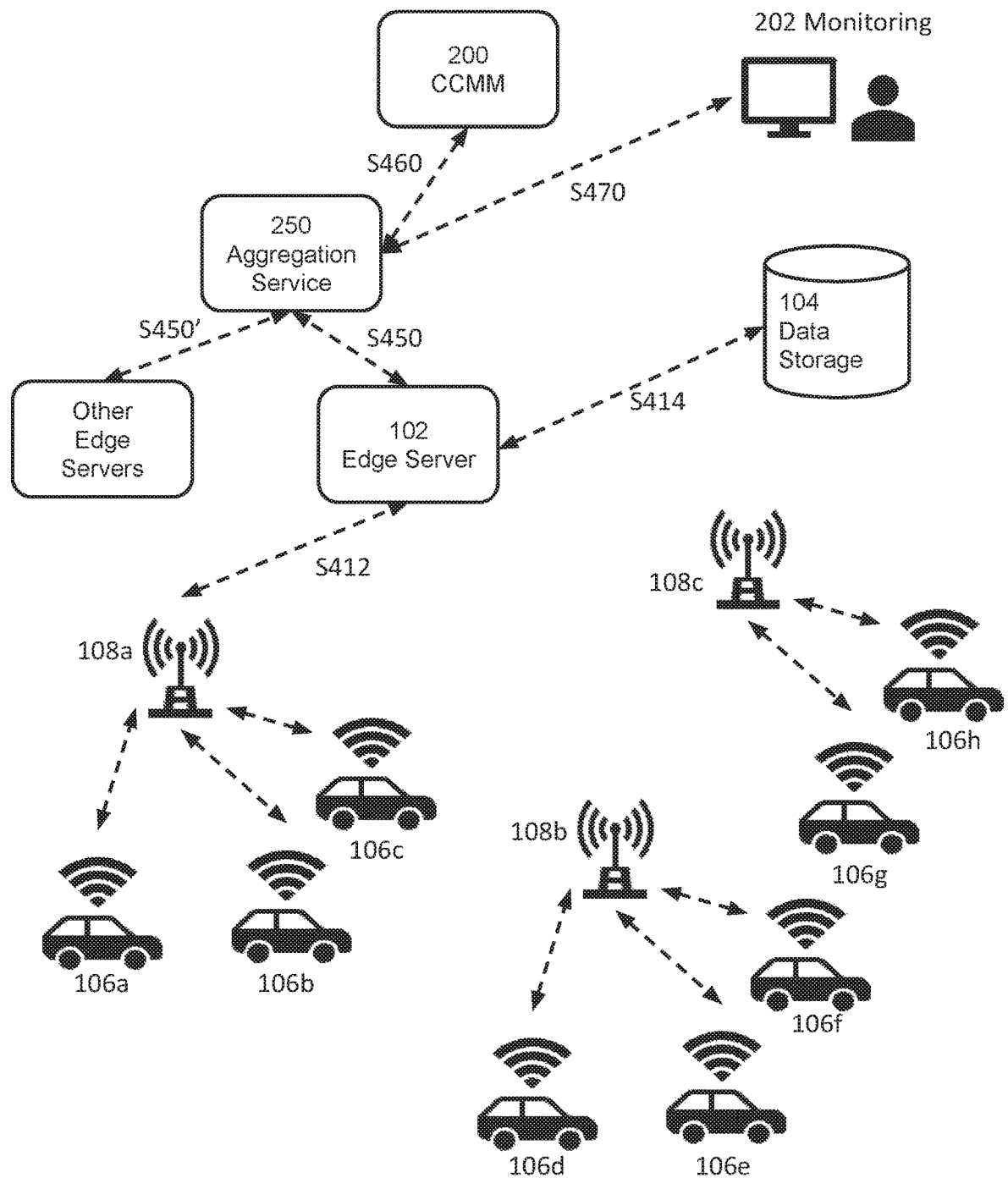
FIG. 4B is a diagram illustrating a data plane for the system shown in FIG. 4A, in an embodiment.

FIGS. 4A-4B illustrate another embodiment which differs from the embodiment described with respect to FIGS. 2A-2B in that the data plane is used to manage download traffic to mitigate congestion and for other purposes. In effect, a control plane function is incorporated into the data plane.

FIG. 4A illustrates the role of the control plane elements in this embodiment. When a given vehicle (for example, vehicle 106*a*) starts (engine ignition), it contacts the campaign server 100 (S410). Preferably the vehicle can send a message that identifies the individual vehicle, the make/model, and the head unit update status (e.g., current firmware version, etc.), as well as the cell tower ID for the cell tower of a cell network to which the vehicle is currently attached, among other things.

When the campaign server 100 receives a message from a vehicle, it determines whether there are any active campaigns that need to be downloaded to the head unit of the vehicle. Still at S410, the campaign server 100 responds to the vehicle. The campaign server 100 could respond with a message that indicates any of:

1. Nothing to do—everything is up to date
2. Download the update (or updates) immediately and apply them when ready.
3. Retry—check back or download patches at some future time If the answer is 2—'Download an update', the response preferably includes an identifier for the campaign with a URL for the patch to be downloaded.

The campaign server 100 then updates the CCMM 200 about the open campaign, see S402, and also can provide the information to the Monitoring 202 function at S408.

Also shown in FIG. 4A is the ingest of vehicle manufacturer policies 401 into the CCMM 200, which distributes them at S400 to the edge server 102 and other edge servers in the platform. The policies contain logic and settings instructing the edge server 102 on how to handle requests for updates. There may be a wide array of policies. For example, each vehicle manufacturer may create a policy for each make or model of its vehicles, or for each head unit version, or otherwise. There may be policy applicable to each of the cellular providers that the vehicle manufacturer uses.

FIG. 4B illustrates an example of data plane operation. At S412, the head unit of vehicle 106*a* makes an HTTP 'GET' request for the update file using the URL it obtained from the campaign server 100 in FIG. 4A at S410. The hostname of the URL resolves to the IP address of an edge server 102, so the head unit directs its request there. The edge server 102 consults and applies the corresponding policy for the download to determine whether to allow the download to proceed given current conditions (including in particular congestion in the cellular network) and how to manage the download rate and other things.

Figure 5:
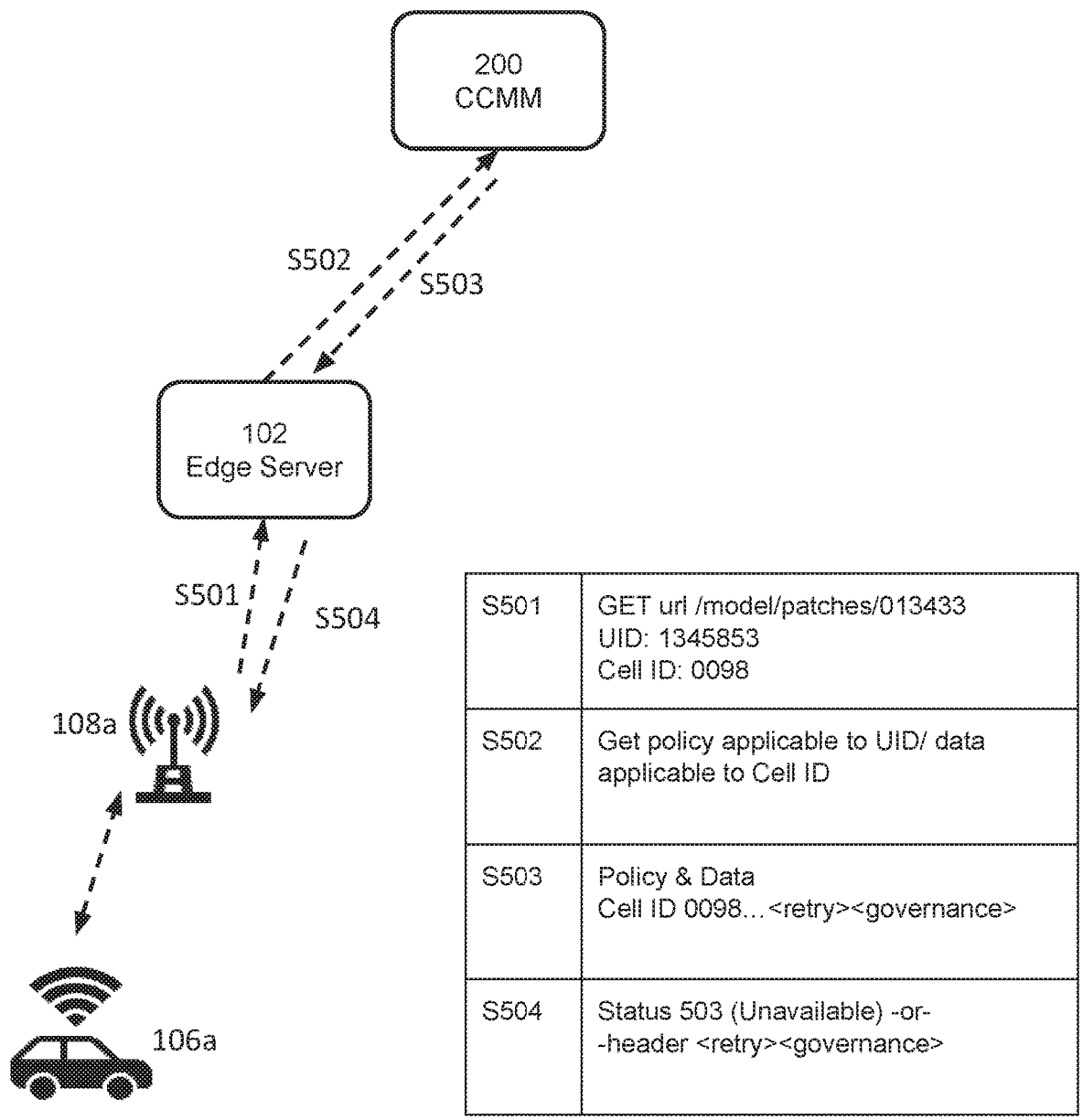
FIG. 5 is a diagram illustrating the content delivery process S412 from the edge server that is shown in FIG. 4B, in one embodiment.

FIG. 5 illustrates the details of the download process.

At S501, the edge server 102 receives a request for the update file from the vehicle 106*a*. In this case, the request is illustrated as an HTTP 'GET' request but this is merely an example; it should be understood that any suitable protocol could be used. Preferably, the request includes headers identifying the head unit, vehicle make and model, as well as the cell tower identifier for the cell tower to which the vehicle is currently connected. In advanced embodiments, the intended route of the vehicle could be sent (e.g., the data being extracted from the vehicle navigation system), which can be used in predicting congestion at cell towers along the route.

The edge server 102 selects and applies the appropriate policy for the download at hand. Assume, for example, that there is a policy for each vehicle manufacturer (e.g., in FIG. 5, the UID is intended to illustrated a unique identifier for an automaker). The edge server 102 identifiers the vehicle manufacturer for vehicle 106*a* and then pulls that policy from the CCMM 200, as shown at S502. The policy is returned at S503. The edge server 102 preferably caches this policy for a time period and reuses it to handle subsequent requests when it applies.

A simple pseudocode example of a policy is:

---

```
IF (vehicle manufacturer's usage policy for date/time/data cap
prohibits this download)
    THEN mitigate with retry
    ELSE proceed
IF (current congestion of vehicle's cell tower > threshold_1)
IF (download not started) THEN mitigate by sending retry
    ELSE mitigate by sending governance value
IF (congestion of vehicle's predicted destination cell tower > threshold_2)
    THEN mitigate by sending governance value
```

```
// threshold_1 and threshold_2 can be set by the vehicle manufacturer
or by the CCMM //service provider (e.g., the CDN)
// campaign priority can be used to override the determination to mitigate,
e.g., a high priority //campaign might be configured to proceed instead of
retry, or to proceed at an unlimited or less //limited rate
(higher governance value)
```

FIG. 5 shows that the edge server 102 also fetches congestion information for the relevant cellular tower ("Cell ID: 0098"). This information can also be a cached for some time at the edge server 102, preferably with a TTL value.

The foregoing is just an example of a pull-based approach for data on cell tower congestion. There are a wide range of data distribution models (e.g. a push model) that can be used to provide current cell tower congestion information to all of the edge servers in the platform.

At S504, the edge server 102 responds to the vehicle 106a. In order to delay the download (e.g., to mitigate current congestion or to prioritize other campaigns in progress), the edge server 102 might respond that the data is unavailable (HTTP Status 503) and that the vehicle 106a and the vehicle 106a should try again at some later time, which delay or time could be specified. If the download can proceed, then the edge server 102 can begin to provide the content. It should be noted that, while an edge server response set of {delay, retry, unavailable, proceed} is preferable, in some alternative and more complex approaches, the edge server could respond with a governance value (e.g. in a header). A governance value means a directive that instructs the vehicle 106a to limit the rate at which it downloads until further directive is received.

Preferably, a given update file is broken into segments, such that a vehicle's head unit can request each portion of a file independently. The same process that was outlined above in connection with the start of a download (FIG. 5 and accompanying description) also can be applied to the start of the download of any segment in the file. This means that, for each segment, a head unit can reconnect or sends a request to the edge server 102 for such segment, and the edge server 102 can check congestion and the policy and decide whether mitigation is needed, before issuing a response.

Segmentation may be accomplished by having independent files that make up a patch and that are specified on a manifest which is delivered to the vehicle, or having byte offsets into a single file that the client can request (e.g., using HTTP range requests or similar mechanism).

Further, a new determination preferably is made when a connection is interrupted (e.g., due to radio interference, congestion, or ignition off, etc.). Upon such a circumstance, the vehicle head unit can try to reconnect and download the remainder of the patch file. The mitigation process outlined above for FIG. 5 would apply again.

Because the patch file is preferably broken into small segments or chunks, and the download manager can reconnect and/or request each one independently, the download manager can control the rate at which the series of chunks are downloaded. To this end, the download manager can pause between segment requests, and/or pace the requests to achieve an instructed governance value.

The above technique is only one example, however. In another embodiment, a vehicle head unit connects (at S501) to the edge server via the HTTP/2 protocol, which enables a single connection to be reused for the message exchange (request and response) for multiple segments. Further, using HTTP/2 server push, the vehicle's head unit could simply wait for the edge server 102, which would push segments at desired pace (e.g., by sending HTTP/2 PUSH_PROMISE frames and then the data).

Finally, in another embodiment, the vehicles' head unit could pace the download by reading from its network buffer in small chunks and taking breaks (e.g., read X bytes, wait Y milliseconds) to achieve the desired data rate. In doing so, the transport layer of the connection would slow the transfer of data between the edge server 102 and vehicle head unit. (This is assuming a TCP/IP connection or any network connection with congestion control mechanisms relying on buffer size.) While the TCP/IP layer wouldn't be as efficient and the transfer windows and acknowledgements (ACKs) would not be optimal, this would accomplish the desired pacing.

Returning to FIG. 4B, as part of the congestion monitoring and mitigation process, the edge server 102 reports on data rates and/or congestion on its connections to vehicles (S450). Meanwhile, other edge servers will report likewise (S450') to the Aggregation Service 250. The Aggregation Service 250 preferably operates as already described with respect to FIG. 3, thus providing aggregated congestion data to the CCMM 200 at S460. The CCMM 200 uses this to update the cell tower congestion data that was described in FIG. 5 (S502/S503).

Data Types

It should be understood that the example of a head unit update file (referred to as a patch) has been used for illustrative purposes throughout this document, the teachings hereof can be used with and apply equally to the delivery of any type of file, and indeed any data, to a vehicle.

Use of System for File Integrity Check

Congestion mitigation is only one reason to reject a download. Another reason to reject a download is if the patch in question has somehow been corrupted. This could be corruption that occurs when loading the patch onto the data storage 104 or when fetching it. This could also be the case of the wrong file being downloaded. Either way, the system could be set to tell all downloaders that the file is temporarily unavailable and then when they do try to download it. A flag can be sent back in either a header and/or payload that indicates that the download should start from the beginning. This is because here is no point completing a download to find that it needs to be deleted and re-downloaded.

Use in Content Delivery Networks

As noted above, the teachings hereof may be implemented in a system in which the edge server 102 in FIGS. 1-5 is a server that is part of a CDN. A description of a conventional CDN is now provided.

A CDN is a distributed computer system and it can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent to nodes that are located in mobile networks, in or adjacent to enterprise-based private networks, or in any combination thereof.

Figure 6:
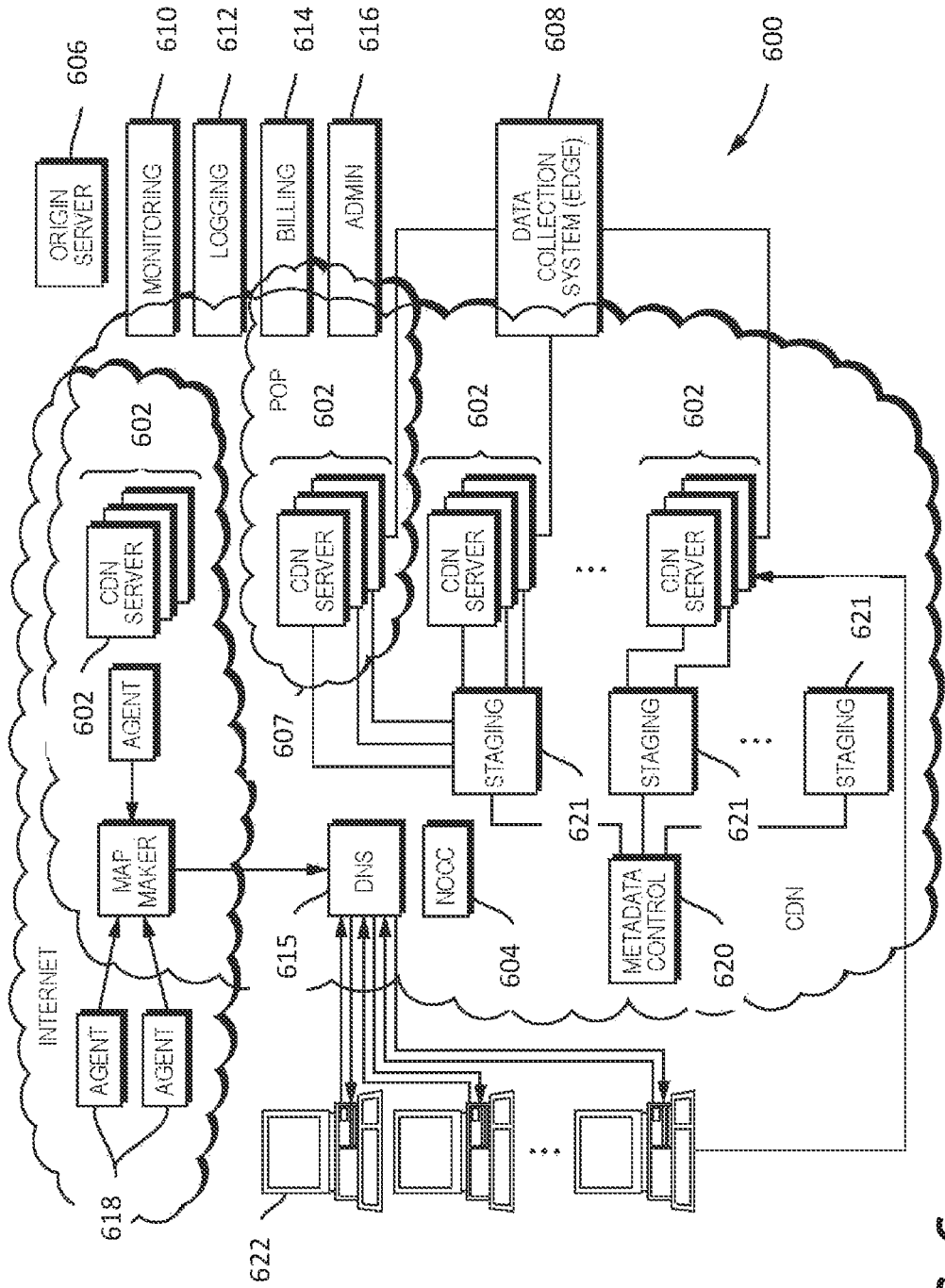
FIG. 6 is a high-level diagram of an embodiment of the content delivery network (CDN) in which the teachings hereof may be implemented; and, FIG. 7 is a block diagram illustrating hardware in a computer system that may be used to implement the teachings hereof.

In a known system such as that shown in FIG. 6, a distributed computer system 600 is configured as a content delivery network (CDN) and is assumed to have a set of machines 602 distributed around the Internet. The machines 602 are servers and can correspond to the edge server 102 in FIGS. 1-5. Typically, most of the machines are configured as servers and located near the edge of the Internet, i.e., at or adjacent end user access networks. A network operations command center (NOCC) 604 may be used to administer and manage operations of the various machines in the system. Third party sites affiliated with content providers, such as web site 606, offload delivery of content (e.g., HTML or other markup language files, embedded page objects, streaming media, software downloads, and the like) to the distributed computer system 600 and, in particular, to the servers 602 (which are sometimes referred to as content servers, or sometimes as "edge" servers in light of the possibility that they are near an "edge" of the Internet). Such servers may be grouped together into a point of presence (POP) 607.

Typically, content providers offload their content delivery by aliasing (e.g., by a DNS CNAME) given content provider domains or sub-domains to domains that are managed by the service provider's authoritative domain name service. End user client machines 622 that desire such content may be directed to the distributed computer system to obtain that content more reliably and efficiently. The CDN servers respond to the client requests, for example by obtaining requested content from a local cache, from another CDN server, from the origin server 106, or other source.

Although not shown in detail in FIG. 6, the distributed computer system may also include other infrastructure, such as a distributed data collection system 608 that collects usage and other data from the CDN servers, aggregates that data across a region or set of regions, and passes that data to other back-end systems 610, 612, 614 and 616 to facilitate monitoring, logging, alerts, billing, management and other operational and administrative functions. Distributed network agents 618 monitor the network as well as the server loads and provide network, traffic and load data to a DNS query handling mechanism 615, which is authoritative for content domains being managed by the CDN. A distributed data transport mechanism 620 may be used to distribute control information (e.g., metadata to manage content, to facilitate load balancing, and the like) to the CDN servers.

A given machine in the CDN comprises commodity hardware (e.g., a microprocessor) running an operating system kernel (such as Linux® or variant) that supports one or more applications. To facilitate content delivery services, for example, given machines typically run a set of applications, such as an HTTP proxy, a name server, a local monitoring process, a distributed data collection process, and the like. The HTTP proxy (sometimes referred to herein as a global host or "ghost") typically includes a manager process for managing a cache and delivery of content from the machine. For streaming media, the machine typically includes one or more media servers, as required by the supported media formats.

A given CDN server 602 may be configured to provide one or more extended content delivery features, preferably on a domain-specific, content-provider-specific basis, preferably using configuration files that are distributed to the CDN servers using a configuration system. A given configuration file preferably includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content, one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 7:
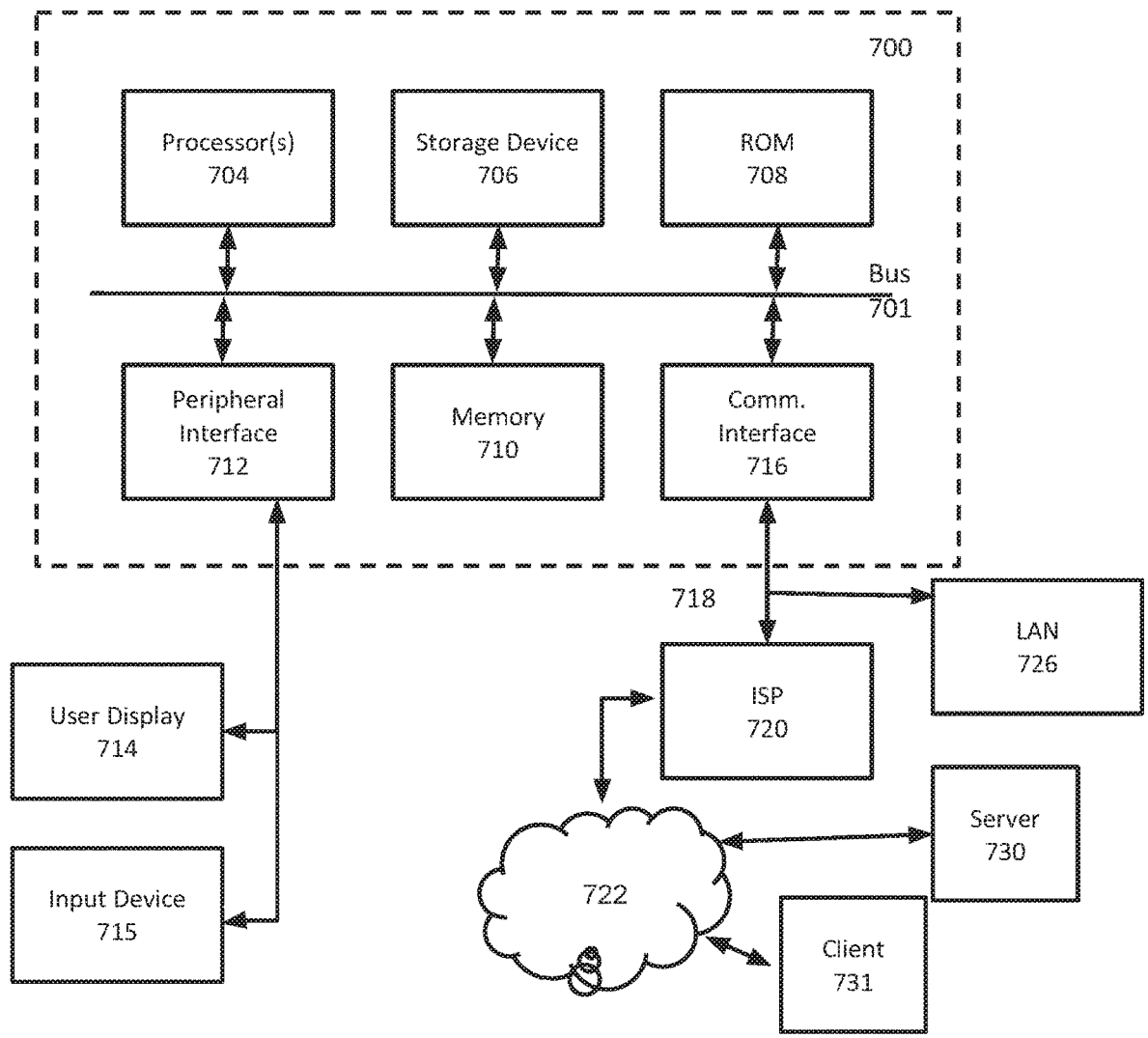

FIG. 7 is a block diagram that illustrates hardware in a computer system 700 upon which such software may run in order to implement embodiments of the invention. The computer system 700 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 700 includes a microprocessor 704 coupled to bus 701. In some systems, multiple processor and/or processor cores may be employed. Computer system 700 further includes a main memory 710, such as a random access memory (RAM) or other storage device, coupled to the bus 701 for storing information and instructions to be executed by processor 704. A read only memory (ROM) 708 is coupled to the bus 701 for storing information and instructions for processor 704. A non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

A peripheral interface 712 communicatively couples computer system 700 to a user display 714 that displays the output of software executing on the computer system, and an input device 715 (e.g., a keyboard, mouse, trackpad, touchscreen) that communicates user input and instructions to the computer system 700. The peripheral interface 712 may include interface circuitry, control and/or level-shifting logic for local buses such as Universal Serial Bus (USB), IEEE 1394, or other communication links.

Computer system 700 is coupled to a communication interface 716 that provides a link (e.g., at a physical layer, data link layer,) between the system bus 701 and an external communication link. The communication interface 716 provides a network link 718. The communication interface 716 may represent a Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731. Network link 718 and such networks may transmit data using packet-switched, circuit-switched, or other data-transmission approaches.

In operation, the computer system 700 may implement the functionality described herein as a result of the processor executing code. Such code may be read from or stored on a non-transitory computer-readable medium, such as memory 710, ROM 708, or storage device 706. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 718 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for managing the delivery of an update to a vehicle, the method comprising:
   A. receiving a request from vehicles in a class to subscribe to a topic corresponding to the class;
   B. starting delivery of a campaign by sending a first message to the class of vehicles, all of which are running and connected to cell towers and have head units, the class of vehicles being defined by one or more of: make, model, and head unit version;
   C. wherein sending the first message comprises publishing the first message to the topic for the class;
   D. wherein the first message comprises any of:
      a. a campaign start message comprising at least one URL for use in downloading an update, and
      b. a contact campaign server message comprising a directive to contact a campaign server for instruction on downloading the update;
   E. determining to send a second message to one or more of the class of vehicles, the second message comprising a directive instructing the one or more of the class of vehicles to take an action regarding downloading of the update from at least one server, the action being any of: pause, delay, throttle, and cancel;
   F. wherein said determination is based at least in part on one or more of: congestion status of one or more cell towers, anticipated congestion status of one or more cell towers, a priority of the campaign relative to a priority of another campaign, and a contractual arrangement between a vehicle manufacturer and a cellular provider.

2. The method of claim 1, wherein the update comprises firmware for a head unit in a vehicle.

3. The method of claim 1, wherein said determination is based at least in part on consulting a policy defined by the vehicle manufacturer.

4. The method of claim 1, further comprising sending the second message to all vehicles in the class.

5. The method of claim 1, further comprising sending the second message to one or more particular vehicles in the class based on detected congestion at a cell tower to which the one or more particular vehicles is connected.

6. The method of claim 1, the first message comprising (a) a campaign start message comprising at least one URL for use in downloading an update.

7. The method of claim 1, the first message comprising (b) a contact campaign server message comprising a directive to contact a campaign server for instruction on downloading the update.

8. The method of claim 1, further comprising receiving congestion data from a cellular provider.

9. The method of claim 1 further comprising receiving congestion data generated by one or more edge servers available to serve the update to vehicles in the class.

10. The method of claim 1, wherein the first message comprises an MQTT message.

11. A method for managing the delivery of an update to a vehicle, the method comprising:
    A. starting delivery of a campaign by sending a first message to a class of vehicles, all of which are running and connected to cell towers and have head units, the class of vehicles being defined by one or more of: make, model, and head unit version,
    B. wherein the first message comprises any of:
       a. a campaign start message comprising at least one URL for use in downloading an update, and
       b. a contact campaign server message comprising a directive to contact a campaign server for instruction on downloading the update;
    C. determining to send a second message to one or more of the class of vehicles, the second message comprising a directive instructing the one or more of the class of vehicles to take an action regarding downloading of the update from at least one server, the action being any of: pause, delay, throttle, and cancel;
    D. wherein said determination is based at least in part on one or more of: congestion status of one or more cell towers, anticipated congestion status of one or more cell towers, a priority of the campaign relative to a priority of another campaign, and a contractual arrangement between a vehicle manufacturer and a cellular provider;
    E. prior to sending the first message, receiving a third message from the campaign server with an instruction to start the campaign, and in response thereto, sending the first message.

12. A system for managing the delivery of an update to a vehicle, the system comprising:
    A. a cellular congestion and download management entity comprising one or more computers having circuitry forming at least one processor and at least one memory device storing instructions for execution on the at least one processor, the instructions when executed causing the one or more computers to:
       a. receive a request from vehicles in the class to subscribe to a topic corresponding to the class;
       b. initiate delivery of a campaign by sending a first message to a class of vehicles, all of which are running and connected to cell towers and have head units, the class of vehicles being defined by one or more of: make, model, and head unit version,
       c. wherein sending the first message comprises publishing the first message to the topic for the class;
       d. wherein the first message comprises any of:
          i. a campaign start message comprising at least one URL for use in downloading an update, and
          ii. a contact campaign server message comprising a directive to contact a campaign server distinct from the cellular congestion and download management entity for instruction on downloading the update;
       e. determine to send a second message to one or more of the class of vehicles, the second message comprising a directive instructing the one or more of the class of vehicles to take an action regarding downloading of the update from at least one server, the action being any of: pause, delay, throttle, and cancel;
       f. wherein said determination is based at least in part on one or more of: congestion status of one or more cell towers, anticipated congestion status of one or more cell towers, a priority of the campaign relative to a priority of another campaign, and a contractual arrangement between a vehicle manufacturer and a cellular provider.

13. The system of claim 12, wherein the update comprises firmware for a head unit in a vehicle.

14. The system of claim 12, wherein said determination is based at least in part on consulting a policy defined by the vehicle manufacturer.

15. The system of claim 12, the instructions when executed further causing the one or more computers to: send the second message to all vehicles in the class.

16. The system of claim 12, the instructions when executed further causing the one or more computers to: send the second message to one or more particular vehicles in the class based on detected congestion at a cell tower to which the one or more particular vehicles is connected.

17. The system of claim 12, the first message comprising (i) a campaign start message comprising at least one URL for use in downloading an update.

18. The system of claim 12, the first message comprising (ii) a contact campaign server message comprising a directive to contact a campaign server for instruction on downloading the update.

19. The system of claim 12, the instructions when executed further causing the one or more computers to: receive congestion data from a cellular provider.

20. The system of claim 12, the instructions when executed further causing the one or more computers to: receive congestion data generated by one or more edge servers available to serve the update to vehicles in the class.

21. The system of claim 12, wherein the first message comprises an MQTT message, and the cellular congestion and download management entity comprises an MQTT broker.

22. A system for managing the delivery of an update to a vehicle, the system comprising:
 A. a cellular congestion and download management entity comprising one or more computers having circuitry forming at least one processor and at least one memory device storing instructions for execution on the at least one processor, the instructions when executed causing the one or more computers to:
  a. initiate delivery of a campaign by sending a first message to a class of vehicles, all of which are running and connected to cell towers and have head units, the class of vehicles being defined by one or more of: make, model, and head unit version,
  b. wherein the first message comprises any of:
   i. a campaign start message comprising at least one URL for use in downloading an update, and
   ii. a contact campaign server message comprising a directive to contact a campaign server distinct from the cellular congestion and download management entity for instruction on downloading the update;
  c. determine to send a second message to one or more of the class of vehicles, the second message comprising a directive instructing the one or more of the class of vehicles to take an action regarding downloading of the update from at least one server, the action being any of: pause, delay, throttle, and cancel;
  d. wherein said determination is based at least in part on one or more of: congestion status of one or more cell towers, anticipated congestion status of one or more cell towers, a priority of the campaign relative to a priority of another campaign, and a contractual arrangement between a vehicle manufacturer and a cellular provider;
  e. prior to sending the first message, receive a third message from the campaign server with an instruction to start the campaign, and in response thereto, sending the first message.

* * * * *